United States Patent
Kersting et al.

(10) Patent No.: US 11,646,894 B2
(45) Date of Patent: May 9, 2023

(54) SINGLE CHANNEL MULTIPLE ACCESS COMMUNICATIONS SYSTEM

(71) Applicant: International Business Machines Corporation, Armonk, NY (US)

(72) Inventors: Nicholas S. Kersting, Briarcliff Manor, NY (US); Bodhisatwa Sadhu, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 832 days.

(21) Appl. No.: 15/794,201

(22) Filed: Oct. 26, 2017

(65) Prior Publication Data

US 2019/0132132 A1    May 2, 2019

(51) Int. Cl.
| | | |
|---|---|---|
| H04L 9/32 | (2006.01) | |
| H04L 12/18 | (2006.01) | |
| H04L 9/40 | (2022.01) | |
| H04W 12/08 | (2021.01) | |

(52) U.S. Cl.
CPC .......... *H04L 9/3242* (2013.01); *H04L 12/18* (2013.01); *H04L 12/1863* (2013.01); *H04L 63/065* (2013.01); *H04L 63/12* (2013.01); *H04W 12/08* (2013.01)

(58) Field of Classification Search
CPC ... H04L 9/3242; H04L 12/18; H04L 12/1863; H04L 63/065; H04W 12/08
USPC ........................................................ 713/163
See application file for complete search history.

(56) References Cited

U.S. PATENT DOCUMENTS

| | | | |
|---|---|---|---|
| 7,987,479 B1 * | 7/2011 | Day ................ | H04N 21/26208 725/34 |
| 8,065,742 B2 | 11/2011 | Shukla et al. | |
| 9,357,270 B2 | 5/2016 | Haberman et al. | |
| 2005/0233710 A1 * | 10/2005 | Lakkis ............... | H04B 1/71637 455/102 |
| 2010/0005061 A1 * | 1/2010 | Basco ................... | G06F 16/355 704/9 |
| 2013/0114626 A1 * | 5/2013 | Bellessort ............... | H04L 69/04 370/477 |
| 2016/0098986 A1 * | 4/2016 | Hofer .................... | G10L 15/083 704/243 |

(Continued)

OTHER PUBLICATIONS

Anonymously, "Method and System for Sharing Content with Multiple Users over a Plurality of Transmission Mechanisms," An IP.com Prior Art Database Technical Disclosure, published Sep. 7, 2016, 7 pages. http://ip.com/IPCOM/000247434D.

(Continued)

*Primary Examiner* — Shewaye Gelagay
*Assistant Examiner* — Moeen Khan
(74) *Attorney, Agent, or Firm* — Yee & Associates, P.C.

(57) ABSTRACT

A method for securely broadcasting information to a group of undisclosed recipients. The information in an information system is encoded by applying a hash function to a group of messages to form the information stream, wherein portions of the information in the information stream are intended for respective ones of the group of undisclosed recipients. The information is encoded such that that only an intended recipient can decode a portion of the information intended for the intended recipient. The information stream is broadcasted to the group of undisclosed recipients.

20 Claims, 5 Drawing Sheets

(56) References Cited

U.S. PATENT DOCUMENTS

| | | | |
|---|---|---|---|
| 2016/0139819 A1* | 5/2016 | Kataoka | H03M 7/3088 |
| | | | 711/154 |
| 2016/0204914 A1 | 7/2016 | Agee et al. | |
| 2016/0295496 A1* | 10/2016 | Atari | H04W 76/14 |
| 2016/0378752 A1* | 12/2016 | Anderson | G06F 16/2255 |
| | | | 707/747 |
| 2018/0309580 A1* | 10/2018 | Jeon | H04L 9/3242 |
| 2018/0365448 A1* | 12/2018 | Uhr | G06Q 20/36 |
| 2019/0114060 A1* | 4/2019 | Resudek | G06F 9/451 |

OTHER PUBLICATIONS

Anonymously, "Systems and Methods for Delivering Information to a Target Audience," An IP.com Prior Art Database Technical Disclosure, published Feb. 4, 2008, 10 pages. http://ip.com/IPCOM/000167239D.

Tseung et al., "The Implementation of Guaranteed, Reliable, Secure Broadcast Networks," Proceedings of the 1990 ACM Annual Conference on Cooperation, Feb. 20-22, 1990, pp. 259-265.

* cited by examiner

SINGLE CHANNEL MULTIPLE ACCESS COMMUNICATIONS SYSTEM

BACKGROUND

1. Field

The disclosure relates generally to an improved data processing system for communicating messages and, more specifically, to a method, apparatus, and computer program product for broadcasting messages to multiple target parties.

2. Description of the Related Art

In communications, messages are sent from one party to another party. For example, messages can be sent using wireless signals. With wireless signals, encoding, modulation, and access are steps that are performed to send the message to a recipient. For example, the message can be encoded to prevent eavesdropping. For example, if the message is a number, the number can be converted to a binary form to encode the number. In the modulation step, this binary number is converted to a physical signal with, e.g. frequency key shifting, in which "0" is assigned one frequency and "1" is assigned to another frequency. Phase shift keying, amplitude shift keying, or some other type of modulation can be performed. The modulated signal is sent via a shared communication channel using sharing schemes such as Time Division Multiple Access (TDMA), Frequency Division Multiple Access (FDMA), or Code Division Multiple Access (CDMA) to ensure that only the intended recipient of the message receives the signal. When the signal is received by the recipient, the recipient can proceed to demodulate and decode the message.

Regardless of whether TDMA, FDMA, or CDMA is used, the recipient knows the signal characteristics used by the broadcaster in order to decode only a portion of the signal that is relevant. For example, with TDMA, the recipient knows what time interval to demodulate. With FDMA, the recipient knows which frequency bands to accept, and with CDMA, pre-defined code is applied to the signal.

This type of broadcasting of messages works as long as the group of recipients for the messages are always accessible via fixed, pre-arranged channel properties. Additionally, the broadcaster knows which ones of the parties are the intended recipients of the broadcast.

SUMMARY

According to one embodiment of the present invention, a method for securely broadcasting information to a group of undisclosed recipients is present. The information in an information system is encoded by applying a hash function to a group of messages to form the information stream, wherein portions of the information in the information stream are intended for respective ones of the group of undisclosed recipients. The information is encoded such that that only an intended recipient can decode a portion of the information intended for the intended recipient. The information stream is broadcasted to the group of undisclosed recipients.

According to another embodiment of the present invention, a message broadcasting system is present. The message broadcasting system comprises a computer system and a broadcaster running on the computer system. The broadcaster encodes information into an information stream by applying a hash function to a group of messages to form the information stream, wherein portions of the information in the information stream are intended for respective ones of a group of undisclosed recipients. The information is encoded such that only an intended recipient can decode a portion of the information intended for the intended recipient and broadcasts the information stream to the group of undisclosed recipients.

According to yet another embodiment of the present invention, a computer program product for securely broadcasting information to a group of undisclosed recipients is presented. The computer program product comprises a computer-readable storage media, first program code, and second program code. The first program code and second program code are stored on the computer-readable storage media. The first program code encodes the information in an information stream by applying a hash function to a group of messages to form the information stream, wherein portions of the information in the information stream are intended for respective ones of the group of undisclosed recipients. The information is encoded such that only an intended recipient can decode a portion of the information intended for the intended recipient. The second program code broadcasts the information stream to the group of undisclosed recipients.

DETAILED DESCRIPTION

The present invention may be a system, a method, and/or a computer program product. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random-access memory (RAM), a read-only memory (ROM), an erasable programmable read-only memory (EPROM or Flash memory), a static random-access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account one or more different considerations. For example, the illustrative embodiments recognize and take into account that in some cases it may be desirable to send messages to one or more recipients that may be undisclosed to the broadcaster. For example, the illustrative embodiments recognize and take into account that it may be desirable to send messages to recipients matching a certain semantic query rather than to specifically known recipients.

For example, the broadcaster may desire to send messages to all vehicles driven by a doctor within a geographic location. In this case, the recipient is undisclosed. In other words, the recipient, if present, is unknown to the broadcaster. The illustrative embodiments recognize and take into account that this type of broadcasting of messages in a secure manner is infeasible with current techniques for broadcasting messages.

The illustrative embodiments recognize and take into account that one manner in which these types of messages can be broadcasted to undisclosed recipients involves sending the unencoded message to all recipients and waiting for a response. If a response is received, then additional messages are exchanged to verify the legitimacy of the responding recipient. The illustrative embodiments recognize and take into account that this type of process is unsecured and less inefficient than desired.

Thus, the illustrative embodiments provide a method, apparatus, and computer program product for broadcasting information to a group of undisclosed recipients. In one illustrative example, the information is encoded in an information stream. Portions of the information in the information stream are intended for respective ones of the group of undisclosed recipients, and the information is encoded such that only an intended recipient can decode a portion of the information intended for the intended recipient in the group of undisclosed recipients. The information stream is broadcast to the group of undisclosed recipients.

Figure 1:
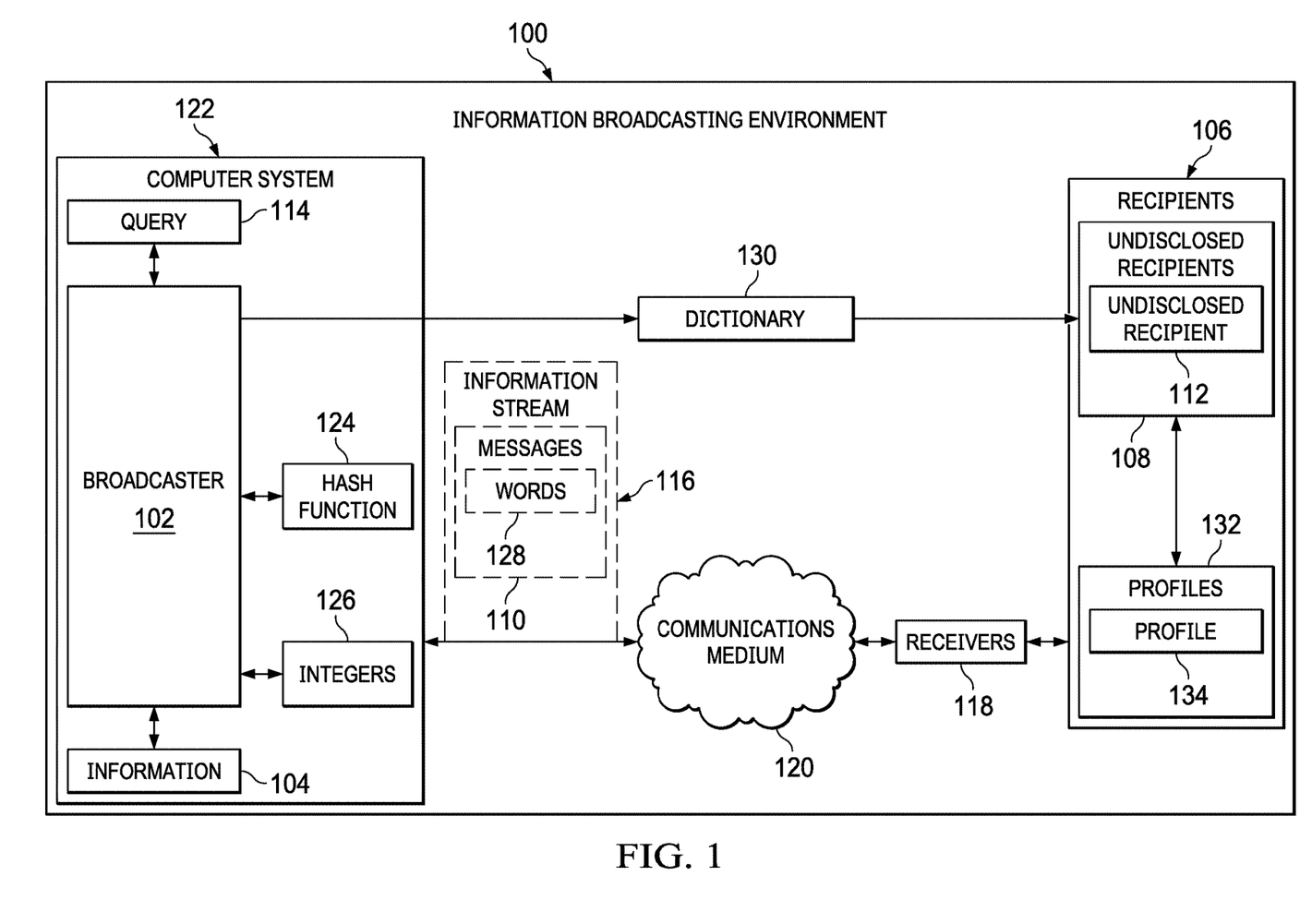
FIG. 1 is a block diagram of an information broadcasting environment in accordance with an illustrative embodiment.

With reference now to the figures and, in particular, with reference to FIG. 1, a block diagram of an information broadcasting environment is depicted in accordance with an illustrative embodiment. Information broadcasting environment 100 is an environment in which broadcaster 102 can broadcast information 104 to a group of recipients 106. As used herein, a "group of" when used with reference to items means one or more items. For example, a group of recipients is one or more of recipients 106.

In this illustrative example, the group of recipients 106 is a group of undisclosed recipients 108. An undisclosed recipient is a recipient that is not specifically known ahead of time to broadcaster 102. For example, broadcaster 102 does not know a name, email address, phone number for text messages, or other information that specifically identifies undisclosed recipient 112 in undisclosed recipients 108. Instead, broadcaster 102 may direct messages 110 containing information 104 using query 114.

In this illustrative example, query 114 is a group of words that can be used in one or more of messages 110 to direct messages 110 to undisclosed recipients 108 that meet query 114. Undisclosed recipients 108 can be compared to query 114 using profiles 132 for undisclosed recipients 108 to see whether any of undisclosed recipients 108 are intended recipients for the group of messages 110.

In this example, broadcaster 102 broadcasts messages 110 in information stream 116 to a group of receivers 118 for the group of undisclosed recipients 108 over communications medium 120. The group of receivers 118 are hardware devices that can receive information stream 116. For example, the group of receivers 118 may be selected from at least one of a mobile phone, a tablet computer, a laptop computer, a desktop computer, a server computer, a set-top box, a kiosk, or some other suitable type of device that is capable of receiving information stream 116.

As depicted, communications medium 120 may take a number of different forms. For example, communications medium 120 includes at least one of a local area, a wide area network, an intranet, the Internet, a wired network, an optical network, a wireless network, a cellular network, or some other suitable type of medium.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In this illustrative example, broadcaster 102 is located in computer system 122, which is in communication with communication medium 120. Broadcaster 102 and computer system 122 form a message broadcasting system that is, in this example, a single channel multiple access communications system.

As depicted, broadcaster 102 may be implemented in software, hardware, firmware, or a combination thereof. When software is used, the operations performed by broadcaster 102 may be implemented in program code configured to run on hardware, such as a processor unit. When firmware is used, the operations performed by broadcaster 102 may be implemented in program code and data and stored in persistent memory to run on a processor unit. When hardware is employed, the hardware may include circuits that operate to perform the operations in broadcaster 102.

Computer system 122 is a physical hardware system and includes one or more data processing systems. When more than one data processing system is present, those data processing systems are in communication with each other using network. The data processing systems may be selected from at least one of a computer, a server computer, a tablet, or some other suitable data processing system.

As depicted, broadcaster 102 encodes information 104 in information stream 116. In this illustrative example, information stream 116 includes messages 110 containing the encoded information. In this illustrative example, portions of information 104 in information stream 116 are intended for respective ones of the group of undisclosed recipients 108. Information 104 is encoded such that only an intended recipient in the group of undisclosed recipients 108 can decode a portion of the information 104 intended for the intended recipient. Broadcaster 102 broadcasts information stream 116 to the group of undisclosed recipients 108. Broadcasting is the transmission of information stream 116 such that all of receivers 118 can receive information stream 116.

In one illustrative example, in encoding information 104 into information stream 116, broadcaster 102 applies hash function 124 to a group of messages 110 to form information stream 116. Hash function 124 is utilized by broadcaster 102 to encode the group of messages 110. For example, broadcaster 102 identifies integers 126 from words 128 in the group of messages 110 in information stream 116 using dictionary 130. In this example, dictionary 130 maps words 128 to integers 126. Dictionary 130 can be selected from a group comprising a shared dictionary, a profile dependent dictionary or some other suitable type of dictionary. A shared dictionary is one that is utilized by broadcaster 102 and one or more of undisclosed recipients 108 that have profiles 132.

A profile dependent dictionary is a dictionary assigned to one or more profiles in profiles 132. In this illustrative example, a profile dependent dictionary is a pre-agreed upon dictionary (hash from words to sets of integers) which is known by both broadcaster 102 and a portion of receivers 118 used by a portion of undisclosed recipients 108. For example, broadcaster 102 chooses a dictionary which is known only to some desired subset of receivers 118. For example, if broadcaster 102 wants to send messages 110 only to various groups of police units, messages 110 are hashed with a dictionary that are only used by receivers 118 for undisclosed recipients 108 which are the police. Other receivers in receivers 118 using a different dictionary will not decode messages 110. In this manner, broadcaster 102 utilizes one or more of these profile dependent dictionaries depending on which ones of undisclosed recipients 108 are intended to receive messages 110.

Broadcaster 102 applies hash function 124 to integers 126 to form information stream 116. As depicted, information 104 is encoded using a n-Sum hashing process with dictionary 130.

As depicted, undisclosed recipients 108 have profiles 132. Profiles 132 describe undisclosed recipients 108. Profiles 132 can include words that correspond to words in query 114 used in messages 110 encoded in information stream 116. Profiles 132 can be used to determine which ones of undisclosed recipients 108 are intended to receive portions of information stream 116.

For example, profiles 132 can include at least one of a residence location, a profession, a job, a hobby, an identification of relatives, a profession group, a social group, a recently-visited location, a current location, or other suitable information about the undisclosed recipients. In this example, a set of intersections of profile 134 of undisclosed recipient 112 hashed using dictionary 130 with information stream 116 identifies the portions of information stream 116 intended for undisclosed recipient 112. This process of identifying the intersection can be performed by undisclosed recipient 112 to determine which portions of information stream 116 are intended for recipient 106.

Undisclosed recipient 112 decodes the portions of information stream 116 intended for undisclosed recipient 112 using dictionary 130. In this example, dictionary 130 is used by broadcaster 102 and undisclosed recipients 108. Undisclosed recipient 112 is unable to decode portions of information stream 116. As a result, information stream 116 can securely be sent to intended ones of undisclosed recipients 108 that have profiles 132 that match query terms in words 128 in information stream 116.

Undisclosed recipient 112 can send a message in return to broadcaster 102. Broadcaster 102 can now direct messages to undisclosed recipient 112. In this manner, broadcaster 102 and undisclosed recipient 112 can directly communicate with each other.

Additionally, different portions of information stream 116 can be sent in a manner that allows intended ones of undisclosed recipients 108 to receive those portions at receivers 118 while other the portions may not be received. In broadcasting information stream 116 to the group of undisclosed recipients 108, broadcaster 102 broadcasts information stream 116 in a signal to the group of undisclosed recipients 108 using at least one of a wireless broadcasting mechanism or a wired broadcasting mechanism.

For example, information 104, when broadcast using a wireless signal, can be mapped to at least one of a frequency, a time slot, or a channel for use in broadcasting information stream 116. In this example, broadcaster 102 can modulate the wireless signal by mapping weights onto a group of frequencies and performing a digital fast Fourier transform operation to form a modulated signal. Broadcaster 102 then broadcasts the modulated signal using at least one of a wireless broadcasting mechanism or a wired broadcasting mechanism. These weights can be tuned to emphasize greater sensitivity to different parts of the signal. For example, different parts of the signal may be aligned with different message semantics.

In this example, broadcaster 102 may be implemented in software, hardware, firmware, or a combination thereof. When software is used, the operations performed by broadcaster 102 may be implemented in program code configured to run on hardware, such as a processor unit. When firmware is used, the operations performed by broadcaster 102 may be implemented in program code and data and stored in persistent memory to run on a processor unit. When hardware is employed, the hardware may include circuits that operate to perform the operations in broadcaster 102.

In this illustrative example, broadcaster 102 encodes the single information stream. In one illustrative example, one or more solutions are present that overcome a problem with sending messages to recipients who are not specifically known. One or more solutions in the illustrative example can provide a technical effect of providing a method, apparatus, and computer program product for broadcasting information to a group of undisclosed recipients. In one illustrative example, the information is encoded in an information stream. Portions of the information in the information stream are intended for respective ones of the group of undisclosed recipients, and the information is encoded such that only an intended recipient can decode a portion of the information intended for the intended recipient in the group of undisclosed recipients. The information stream is broadcast to the group of undisclosed recipients such that only the intended undisclosed recipients can decode the portion of the information stream directed towards that particular undisclosed recipient. Undisclosed recipients can be indirectly through query terms using a dictionary shared between the broadcaster and the undisclosed recipients.

As a result, computer system 122 operates as a special purpose computer system in which broadcaster 102 in computer system 122 enables sending messages 110 to undisclosed recipients 108 in a manner such that only the intended ones of undisclosed recipients 108 can decode the information in information stream 116 intended for undisclosed recipients 108. In particular, broadcaster 102 transforms computer system 122 into a special purpose computer system as compared to currently available general computer systems that do not have broadcaster 102.

The illustration of information broadcasting environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 2:
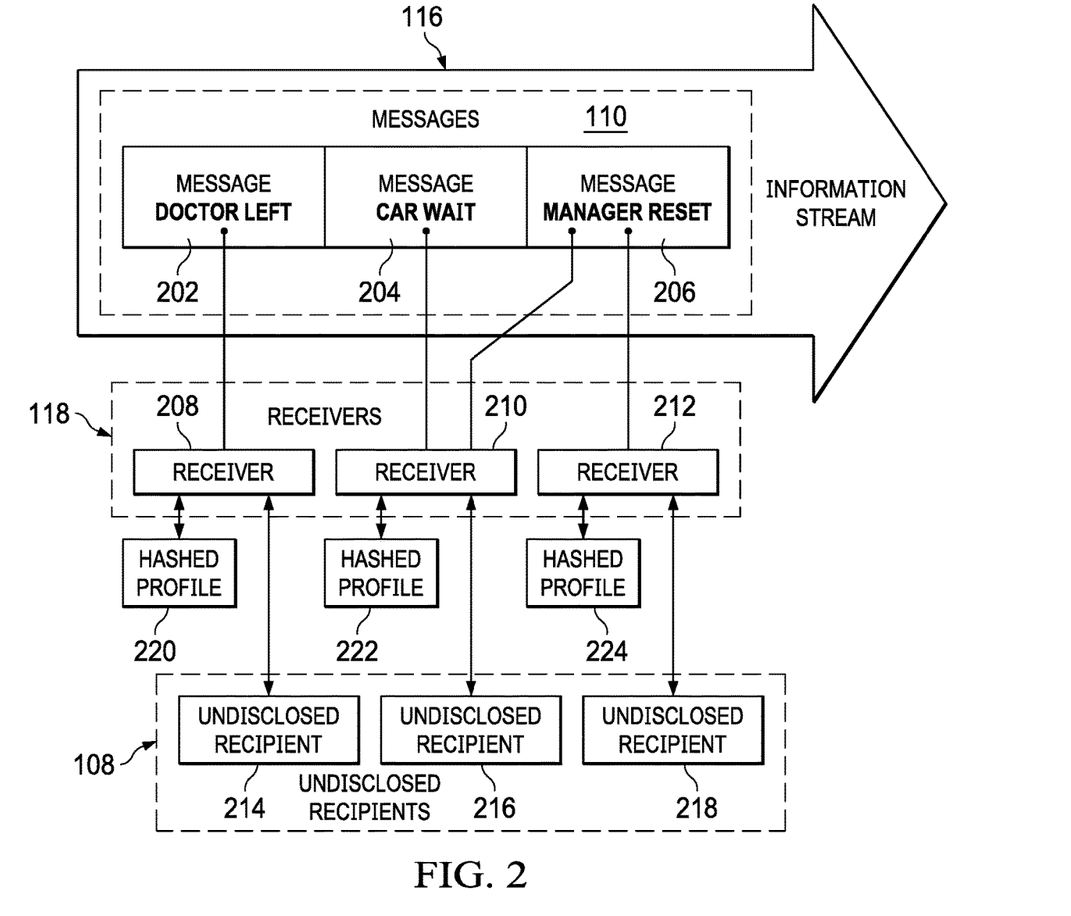
FIG. 2 is a block diagram of an information stream in accordance with an illustrative embodiment.

With reference next to FIG. 2, a block diagram of an information stream is depicted in accordance with an illustrative embodiment. In the illustrative examples, the same reference numeral may be used in more than one figure. This reuse of a reference numeral in different figures represents the same element in the different figures.

An example of messages 110 in information stream 116 is shown in this figure. As depicted, information stream 116 includes information 104 that has been hashed into integers for messages 110. As illustrated, messages 110 in information stream 116 comprise message 202, message 204, and message 206.

As depicted, message 202 is "Doctor Left;" message 204 is "Car Wait;" and message 206 is "Manager Reset." In this illustrative example, the integers in messages 110 are mapped to radio frequencies for general reception. The integers in messages 110 for information stream 116 are mapped to frequencies. An integer in a message may be broadcast using associated frequency using frequency division multiple access (FDMA).

In other examples, the integers may be mapped to timeslots for transmitting information stream 116 using time division multiple access (TDMA). These integers in messages 110 in information stream 116 may be mapped to codes to transmit information stream 116 using code division multiple access (CDMA). In yet another example, some combination of frequency division multiple access, time division multiple access, and code division multiple access can be used.

As depicted, receivers 118 include receiver 208, receiver 210, and receiver 212. These receivers are hardware devices used by undisclosed recipient 214, undisclosed recipient 216, and undisclosed recipient 218 in undisclosed recipients 108. In this example, undisclosed recipient 214 has hashed profile 220; undisclosed recipient 216 has hashed profile 222, and undisclosed recipient 218 has hashed profile 224. These hashed profiles are generated from profiles 132 for these undisclosed recipients, using the same hash function used to generate information stream 116 using dictionary 130 in FIG. 1.

Each of these receivers can receive information stream 116 and compare information stream 116 to the corresponding hashed profile. In this example, receiver 208 can decode message 202. Receiver 210 can decode message 204 and message 206. Receiver 212 can decode message 206. Sufficient overlap in hashed profile 222 with the words in message 204 and message 206 is present to allow receiver 212 for undisclosed recipient 218 to decode both message 204 and message 206. For example, hashed profile 224 may include "Manager," "Car," which may overlap the query terms in message 204 and message 206 sufficiently to enable receiver 210 for undisclosed recipient 216 to read both messages.

Figure 3:
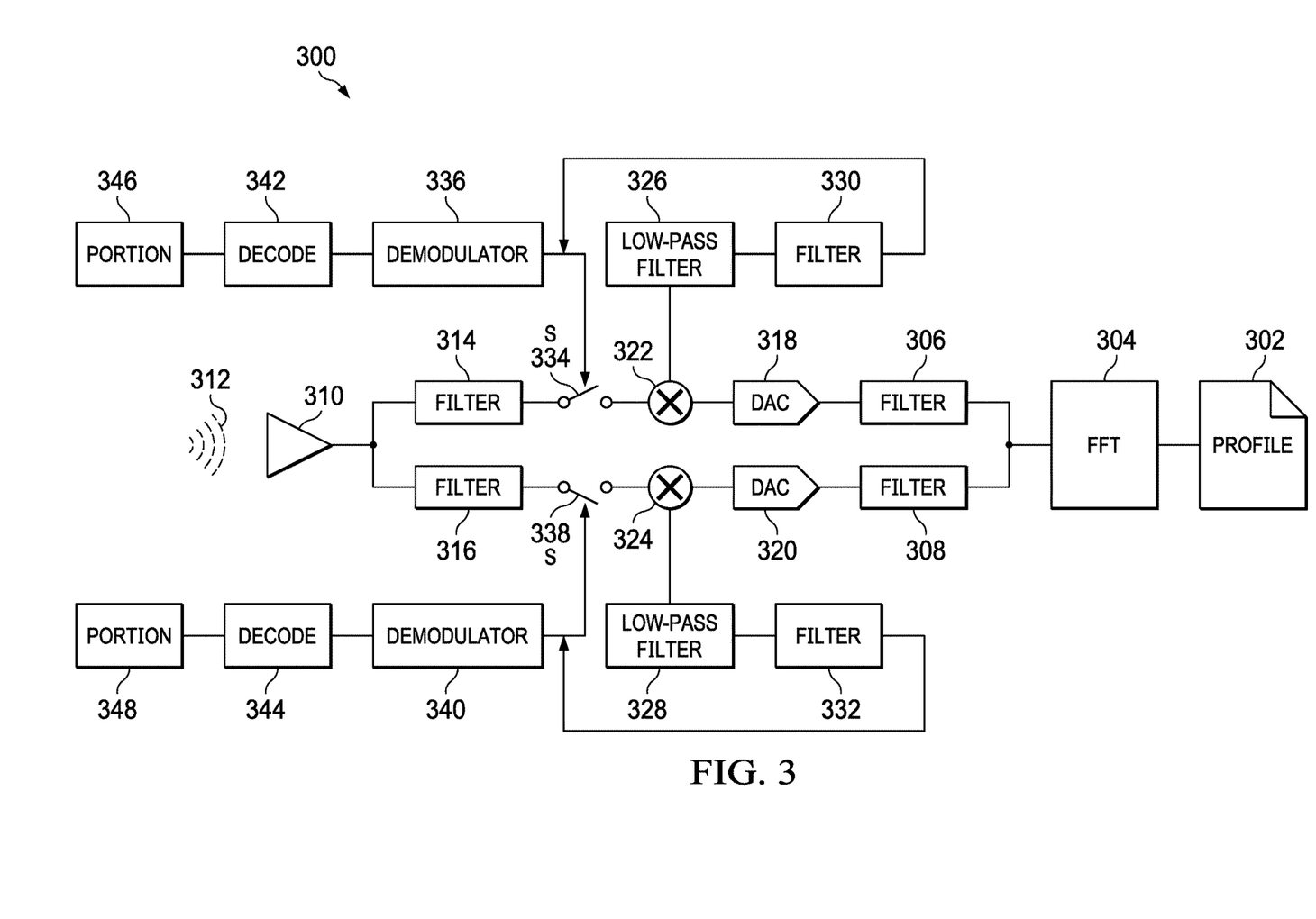
FIG. 3 is an illustration of a receiver in accordance with an illustrative embodiment.

With reference next to FIG. 3, an illustration of a receiver is depicted in accordance with an illustrative embodiment. In this depicted example, receiver 300 is an example of one implementation for receivers 118 in FIG. 1, receiver 208 in FIG. 2, receiver 210 in FIG. 2, and receiver 212 in FIG. 2. The different components in receiver 300 are shown using hardware. The one or more functions performed by the hardware can also be implemented in software in addition to or in place of the hardware.

As depicted, profile 302 is hashed into integers and is mapped to a frequency domain. In this example, fast Fourier transform system (FFT) 304 transforms profile 302 from the frequency domain into a time domain using an inverse discrete Fourier transform. These numbers in the time domain are divided into a low frequency band by filter 306 and a high frequency band. The low frequency band is obtained using filter 306 and the high frequency band is obtained using filter 308.

This division into two equal bands is an example of an implementation of a 'divide and conquer' search algorithm to compare two spectra. In other illustrative examples, these numbers may be divided into unequal bands more than two bands depending on the particular implementation. When unequal bands are selected, these bands may be based on a probability distribution of where the messages are most likely to occur. In this illustrative example, the numbers in the low frequency band are sent into digital to analog converter (DAC) 318 and the numbers in the high frequency band are sent into digital to analog converter (DAC) 320. Division the numbers into low or high-frequency band may made in a number of different ways. For example, the division may be performed using the midpoint of the total feasible bandwidth, choosing some other threshold for division, or some other suitable division scheme.

In this example, signal 312 is a modulated form of an information stream and is received at input 310. Input 310 can be an antenna, a network interface, or some other input system that receives signal 312. Signal 312 has frequencies and is likewise divided into a low frequency band by filter 314 and a high frequency band by filter 316.

The output of digital to analog converter 318 is connected to the input of multiplier 322. The output of filter 314 is connected to the input of multiplier 322. The output of digital to analog converter 320 is connected to the input of multiplier 324. The output of filter 316 is also connected to the input of multiplier 324.

The results of multiplier 322 are sent to low-pass filter 326. In a similar fashion, the result of multiplier 324 is sent to low-pass filter 328. A threshold is applied to the output of low-pass filter 326 by filter 330. This threshold can be selected based on the resolution of the hardware or software utilized. For example, with an ideal noiseless environment in which the hardware has infinite resolution, the threshold is exactly 0. With noise, the threshold may be dependent on the signal to noise ratio of the input signal.

A threshold is also applied to the output of low-pass filter 328 by filter 332. If an output is not passed by either of these filters through the application in the threshold, the process terminates and no further processing of the signal occurs. If a signal is passed through one of these filters, then the process can be performed again using fast Fourier transform system 304 to iterate the process described with the current half of the band being split into half If the band is small enough that further division is not needed, the position of switch 334 is changed to send the signal from filter 314 to demodulator 336. For example, the band may be determined to be small enough when the cost in terms of power consumption and latency of performing a full demodulation is comparable to the cost of further processing using the divide and conquer search algorithm. In a similar fashion, if an output is generated at filter 332, switch 338 changes to send the signal from filter 316 to demodulator 340.

The description in this example is with respect to the processing of the low frequency band. The same processing is performed for the low frequency band and the high frequency band. At this time, the bands being processed for signal 312 and profile 302 have some overlapping frequency components which are the intersection. These overlaps in the bands are identified when filter 330 or filter 332 outputs a signal. When such an overlap is identified, the original unmultiplied waveforms in the respective band is demodulated. The original waveform is demodulated using demodulator 336 or demodulator 340 to obtain the respective n-Sum sets or multi-sets. Next, decode 342 and decode 344 can decode part of the signal containing the intersection between profile 302 and the corresponding frequency band from signal 312.

The output of decode 342 is portion 346 of the message in signal 312 for the undisclosed recipient based on profile 302. In a similar fashion, the output of decode 344 is portion 348 of the message in signal 312 that is intended for the undisclosed recipient based on profile 302. In this manner, the undisclosed recipient can determine the informational content of the portion of the message that is intended for the undisclosed recipient. This process is performed to obtain a portion of the information for each frequency or range of frequencies that are passed through filter 330 or filter 332. In this manner, receiver 300 is capable of quickly determining large regions of the frequency spectrum that do not need to be compared to determine an intersection.

As a result, receiver 300 can identify that sufficient overlap between signal 312 and profile 302 to justify further processing. When sufficient overlap is present, signal 312 can be demodulated and decoded.

In this manner, receiver 300 for the undisclosed recipient can reconstruct a message intended for the undisclosed recipient. This type of process increases security and efficiency. Efficiency is increased by avoiding irrelevant portions of signal 312 that would otherwise be processed for portions that are intended for the undisclosed recipient.

Figure 4:
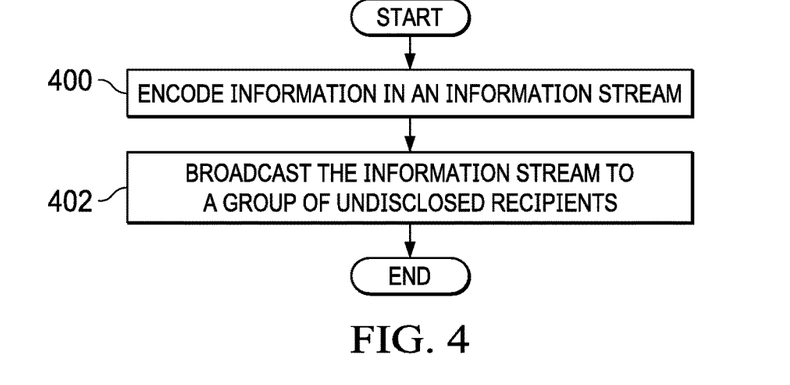
FIG. 4 is a flowchart of a process for securely broadcasting information to a group of undisclosed recipients in accordance with an illustrative embodiment.

Turning next to FIG. 4, a flowchart of a process for securely broadcasting information to a group of undisclosed recipients is depicted in accordance with an illustrative embodiment. The process illustrated in FIG. 4 can be implemented in at least one of software or hardware. As depicted, this process may be implemented in broadcaster 102 shown in block form in FIG. 1.

The process begins by encoding information in an information stream (step 400). The portions of the information in the information stream are intended for respective ones of a group of undisclosed recipients. In step 400, the information is encoded such that only an intended recipient can decode a portion of the information intended for an intended recipient. The process broadcasts the information stream to a group of undisclosed recipients (step 402). The process terminates thereafter.

Figure 5:
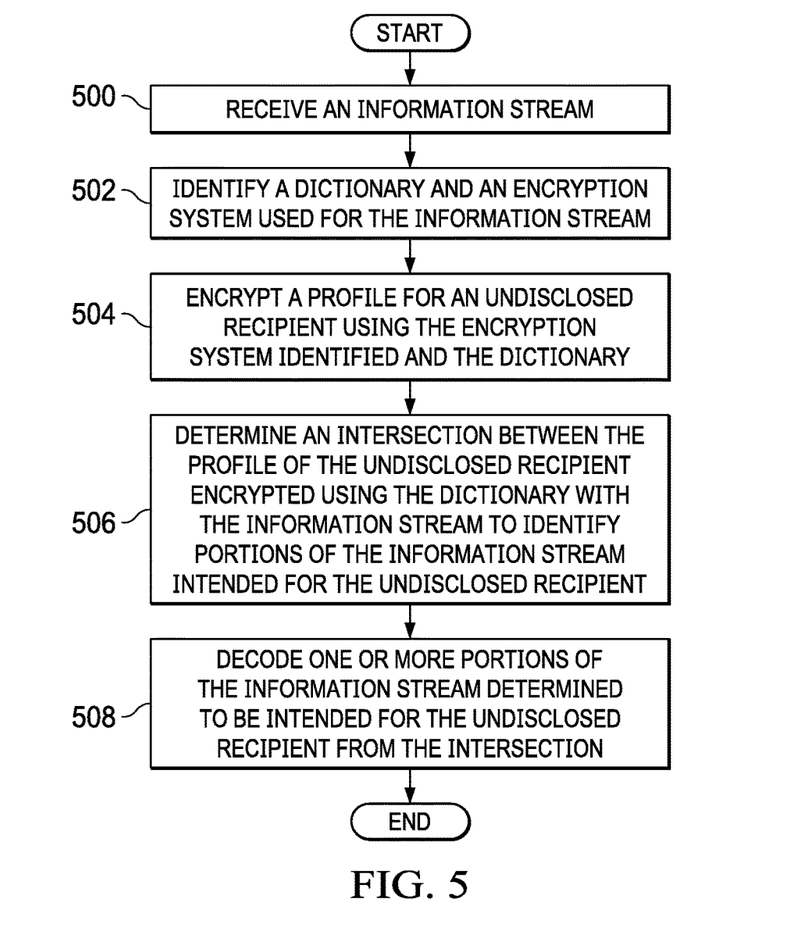
FIG. 5 is a flowchart of a process for receiving messages in accordance with an illustrative embodiment.

With reference next to FIG. 5, a flowchart of a process for receiving messages is depicted in accordance with an illustrative embodiment. The process illustrated in FIG. 5 can be implemented in a receiver in receivers 118 in FIG. 1. This process can be implemented to receive a message from a broadcaster without the message being directed specifically to the undisclosed recipient.

The process begins by receiving an information stream (step 500). The process identifies a dictionary and an encryption system used for the information stream (step 502). The process encrypts a profile for an undisclosed recipient using the encryption system identified and the dictionary (step 504.) In this illustrative example, the encryption system employs an n-Sum hashing. In the illustrative example, any other privacy-preserving schemes can also be utilized to reveal the intersection of two sets without trivially disclosing elements outside the intersection. For example, a private set intersection protocol can be used.

The process determines an intersection between the profile of the undisclosed recipient encrypted using the dictionary with the information stream to identify portions of the information stream intended for the undisclosed recipient (step 506). The process then decodes one or more portions of the information stream determined to be intended for the undisclosed recipient from the intersection (step 508). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 6:
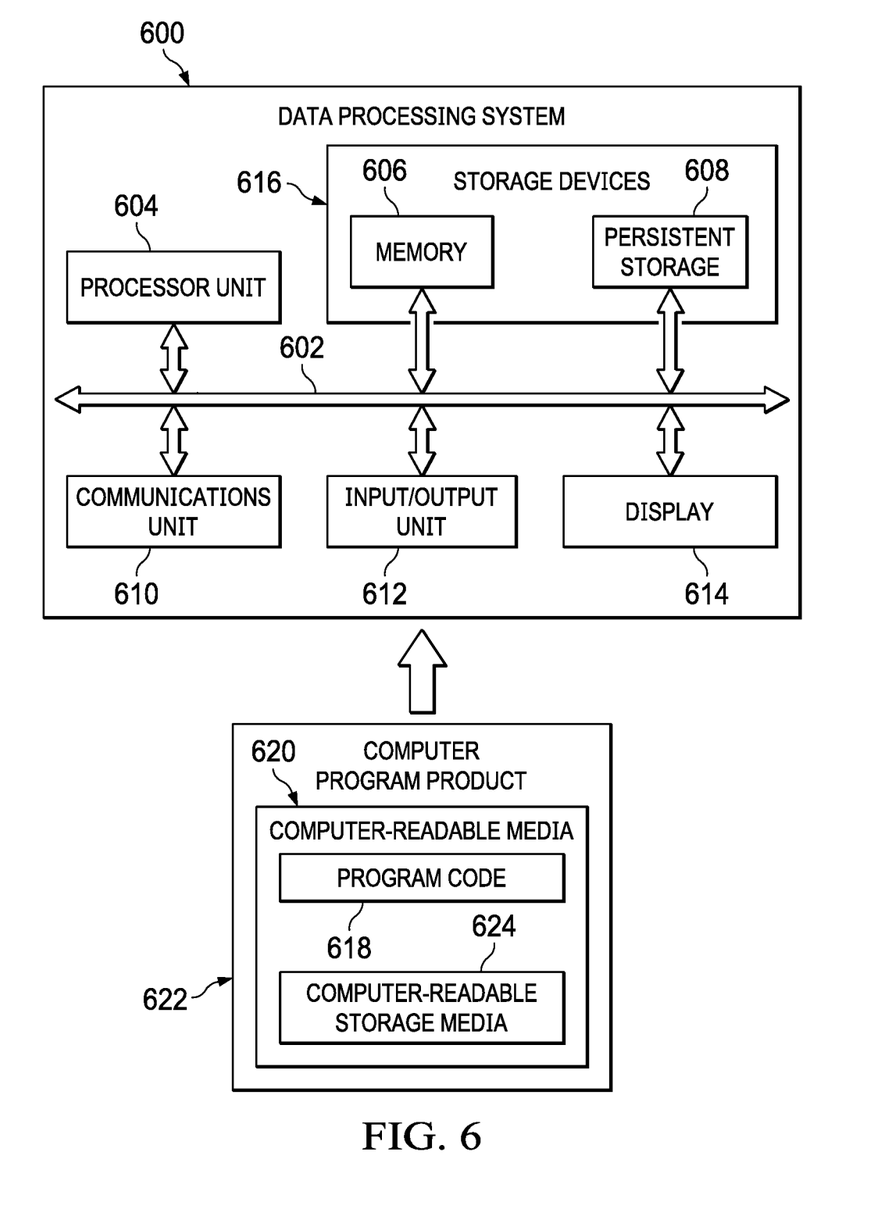
FIG. 6 is a block diagram of a data processing system in accordance with an illustrative embodiment.

Turning now to FIG. 6, a block diagram of a data processing system is depicted in accordance with an illustrative embodiment. Data processing system 600 may be used to implement at least one of computer system 122, broadcaster 102, receivers 118, receiver 208, receiver 210, or receiver 212 of FIGS. 1-2. In this illustrative example, data processing system 600 includes communications framework 602, which provides communications between processor unit 604, memory 606, persistent storage 608, communications unit 610, input/output (I/O) unit 612, and display 614. In this example, communications framework 602 may take the form of a bus system.

Processor unit 604 serves to execute instructions for software that may be loaded into memory 606. Processor unit 604 may be a number of processors, a multi-processor core, or some other type of processor, depending on the particular implementation.

Memory 606 and persistent storage 608 are examples of storage devices 616. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 616 may also be referred to as computer-readable storage devices in these illustrative examples. Memory 606, in these examples, may be, for example, a random-access memory or any other suitable volatile or non-volatile storage device. Persistent storage 608 may take various forms, depending on the particular implementation.

For example, persistent storage 608 may contain one or more components or devices. For example, persistent storage 608 may be a hard drive, a solid state hard drive, a flash memory, a rewritable optical disk, a rewritable magnetic tape, or some combination of the above. The media used by persistent storage 608 also may be removable. For example, a removable hard drive may be used for persistent storage 608.

Communications unit 610, in these illustrative examples, provides for communications with other data processing systems or devices. In these illustrative examples, communications unit 610 is a network interface card.

Input/output unit 612 allows for input and output of data with other devices that may be connected to data processing system 600. For example, input/output unit 612 may provide a connection for user input through at least one of a keyboard, a mouse, or some other suitable input device. Further, input/output unit 612 may send output to a printer. Display 614 provides a mechanism to display information to a user.

Instructions for at least one of the operating system, applications, or programs may be located in storage devices 616, which are in communication with processor unit 604 through communications framework 602. The processes of the different embodiments may be performed by processor unit 604 using computer-implemented instructions, which may be located in a memory, such as memory 606.

These instructions are referred to as program code, computer usable program code, or computer-readable program code that may be read and executed by a processor in processor unit 604. The program code in the different embodiments may be embodied on different physical or computer-readable storage media, such as memory 606 or persistent storage 608.

Program code 618 is located in a functional form on computer-readable media 620 that is selectively removable and may be loaded onto or transferred to data processing system 600 for execution by processor unit 604. Program code 618 and computer-readable media 620 form computer program product 622 in these illustrative examples. In the illustrative example, computer-readable media 620 is computer-readable storage media 624. In these illustrative examples, computer-readable storage media 624 is a physical or tangible storage device used to store program code 618 rather than a medium that propagates or transmits program code 618.

Alternatively, program code 618 may be transferred to data processing system 600 using a computer-readable signal media. The computer-readable signal media may be, for example, a propagated data signal containing program code 618. For example, the computer-readable signal media may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 600 are not meant to provide architectural limitations to the manner in which different embodiments may be implemented. The different illustrative embodiments may be implemented in a data processing system including components in addition to or in place of those illustrated for data processing system 600. Other components shown in FIG. 6 can be varied from the illustrative examples shown. The different embodiments may be implemented using any hardware device or system capable of running program code 618.

Thus, the illustrative examples provide a method, apparatus, and computer program product to broadcast different messages in a single information stream in a single to multiple undisclosed parties that are unknown now to the broadcast of the messages. Although all receivers for the undisclosed recipients receive the same signal, the information stream is encoded. The signal can be decoded by an intended undisclosed recipient using a profile of that undisclosed recipient. As described above, these profiles are semantic profiles. A process at the receiver for the undisclosed recipient matches the undisclosed recipient's semantic profile to a portion of the information stream that is intended for the undisclosed recipient based on the profile. This portion of the information stream in the signal cannot be decoded by any receiver without a suitable profile.

As a result, one or more illustrative examples can be utilized in various situations in which messages are to be broadcast to undisclosed recipients that were not known prior to broadcasting the messages. For example, the illustrative example can be applied to a geographic disaster such as a flood. A wireless carrier may desire to sense location-specific information to mobile phones for activities such as a planned evacuation time and routes to coordinate safe and efficient logistics. In another example, a military operation may involve units from different countries with different communication protocols. To coordinate an action, different messages are sent to different units using their particular protocol. The coordinator does not know which types of units from which countries are present, but can send a message with different requests for compliance from different potential units that may be present using an illustrative example. These units may respond to confirm receipt of the message. In yet another illustrative example, vehicle-to-vehicle messaging may be formed using wireless communications in accordance with an illustrative example. Messages can be sent to undisclosed recipients in these and other situations in an illustrative example.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. For example, although many examples are directed towards wireless communications. the illustrative example also can be applied to wired communications over wired networks. The terminology used herein was chosen to best explain the principles of the embodiment, the practical application or technical improvement over technologies found in the marketplace, or to enable others of ordinary skill in the art to understand the embodiments disclosed here.

For example, the broadcasting of the information stream may use with other types of wireless signals other than radio frequency signals. For example, acoustic signals, light signals, or other types of wireless signals may be used. In another example, the dictionary may map n-grams to integers instead of words to integers. In yet another illustrative example, the broadcasting of information stream also may be based on leveraging physical boundaries or other properties that separate sender and an undisclosed recipient. In this manner, different undisclosed recipients can be targeted. For example, undisclosed recipients may be selected on made based on location underground, underwater, a mountain, or some other location. In still another example, intervening media such as rock, water, and other physical barriers which change the signal propagation can be selected. For example, if the broadcaster only wishes to reach receivers within a valley, the signal wattage and frequency band can be chosen to minimize reception outside of the valley.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for securely broadcasting information to a plurality of undisclosed recipients, the method comprising:
encoding, by a computer system, the information in an information stream by applying a hash function to a plurality of messages to form the information stream, wherein portions of the encoded information in the information stream are intended for respective ones of the plurality of undisclosed recipients, and wherein the information is encoded using a dictionary that is known to both broadcaster and an intended recipient such that only the intended recipient decode a portion of the information intended for the intended recipient;
and broadcasting, by the computer system, the information stream to the plurality of undisclosed recipients.

2. The method of claim 1, wherein applying, by the computer system, the hash function to the plurality of messages to form the information stream comprises:
identifying, by the computer system, integers from words in the plurality of messages in the information stream using the dictionary that maps the words to the integers; and
applying, by the computer system, the hash function to the integers to form the information stream.

3. The method of claim 2, wherein a set of intersections of a profile of an undisclosed recipient hashed using the dictionary with the information stream identifies the portions of the encoded information in the information stream intended for the undisclosed recipient, wherein the undisclosed recipient is unable to decode other portions of the encoded information on the information stream that are not intended for the undisclosed recipient such that the intended recipient is able to decode the portion of the information intended for the intended recipient but is unable to decode the other portions of the encoded information in the information stream that are not intended for the intended recipient.

4. The method of claim 3, wherein the intended recipient is determined using a semantic query, and the profile includes words that correspond to words in the semantic query.

5. The method of claim 1 further comprising:
mapping, by the computer system, the information stream to at least one of a frequency, a time slot, or a channel for use in broadcasting the information stream.

6. The method of claim 1, wherein the plurality of undisclosed recipients are not specifically known ahead of time by the computer system when broadcasting the information stream, and wherein broadcasting, by the computer system, the information stream to the plurality of undisclosed recipients comprises:
broadcasting, by the computer system, the information stream in a signal to the plurality of undisclosed recipients using at least one of a wireless broadcasting mechanism or a wired broadcasting mechanism.

7. The method of claim 6, wherein broadcasting, by the computer system, the information stream in the signal using at least one of the wireless broadcasting mechanism or the wired broadcasting mechanism comprises:
modulating, by the computer system, the signal by mapping weights onto a group of frequencies and performing a digital fast Fourier transform operation to form a modulated signal; and
broadcasting, by the computer system, the modulated signal using at least one of the wireless broadcasting mechanism or the wired broadcasting mechanism.

8. A message broadcasting system for broadcasting information to a plurality of undisclosed recipients comprising:
a computer system; and
a broadcaster running on the computer system, wherein the broadcaster encodes the information into an information stream by applying a hash function to a plurality of messages to form the information stream, wherein portions of the encoded information in the information stream are intended for respective ones of the plurality of undisclosed recipients, and wherein the information is encoded using a dictionary that is known to both the broadcaster and an intended recipient such that only the intended recipient decode a portion of the information intended for the intended recipient and broadcasts the information stream to the plurality of undisclosed recipients.

9. The message broadcasting system of claim 8, wherein in applying the hash function to the plurality of messages to form the information stream, the broadcaster identifies integers from words in the plurality of messages in the information stream using the dictionary that maps the words to the integers and applies the hash function to the integers to form the information stream.

10. The message broadcasting system of claim 9, wherein a set of intersections of a profile of an undisclosed recipient hashed using the dictionary with the information stream identifies the portions of the encoded information in the information stream intended for the undisclosed recipient, wherein the undisclosed recipient is unable to decode other portions of the encoded information on the information stream that are not intended for the undisclosed recipient such that the intended recipient is able to decode the portion of the information intended for the intended recipient but is unable to decode the other portions of the encoded information in the information stream that are not intended for the intended recipient.

11. The message broadcasting system of claim 10, wherein the intended recipient is determined using a semantic query, and the profile includes words that correspond to words in the semantic query.

12. The message broadcasting system of claim 8 further comprising:
mapping the information stream to at least one of a frequency, a time slot, or a channel for use in broadcasting the information stream.

13. The message broadcasting system of claim 8, wherein the plurality of undisclosed recipients are not specifically known ahead of time by the broadcaster when broadcasting the information stream, and wherein in broadcasting the information stream to the plurality of undisclosed recipients, the broadcaster broadcasts the information stream in a signal to the plurality of undisclosed recipients using at least one of a wireless broadcasting mechanism or a wired broadcasting mechanism.

14. The message broadcasting system of claim 13, wherein in broadcasting the information stream in the signal using at least one of the wireless broadcasting mechanism or the wired broadcasting mechanism, the broadcaster modulates the signal by mapping weights onto a group of frequencies and performing a digital fast Fourier transform operation to form a modulated signal and broadcasts the modulated signal using at least one of the wireless broadcasting mechanism or the wired broadcasting mechanism.

15. A computer program product for securely broadcasting information to a plurality of undisclosed recipients, the computer program product comprising: a computer-readable storage media;

first program code, stored on the computer-readable storage media, for encoding the information in an information stream by applying a hash function to a plurality of messages to form the information stream, wherein portions of the encoded information in the information stream are intended for respective ones of the plurality of undisclosed recipients, and wherein the information is encoded using a dictionary that is known to both broadcaster and an intended recipient such that only an intended recipient decode a portion of the information intended for the intended recipient;

and second program code, stored on the computer-readable storage media, for broadcasting the information stream to the plurality of undisclosed recipients.

16. The computer program product of claim 15, wherein the first program code comprises:

first program identifying code, stored on the computer-readable storage media, for identifying integers from words in the plurality of messages in the information stream using the dictionary that maps the words to the integers; and first program applying code, stored on the computer-readable storage media, for applying the hash function to the integers to form the information stream.

17. The computer program product of claim 15 further comprising:

third program code, stored on the computer-readable storage media, for mapping the information stream to at least one of a frequency, a time slot, or a channel for use in broadcasting the information stream.

18. The computer program product of claim 15, wherein the plurality of undisclosed recipients are not specifically known ahead of time by the broadcaster when broadcasting the information stream, and wherein the information stream is broadcast in a signal to the plurality of undisclosed recipients using at least one of a wireless broadcasting mechanism or a wired broadcasting mechanism.

19. The computer program product of claim 18, wherein the second program code comprises:

second program modulating code, stored on the computer-readable storage media, for modulating the signal by mapping weights onto a group of frequencies and performing a digital fast Fourier transform operation to form a modulated signal; and second program broadcasting code, stored on the computer-readable storage media, for broadcasting the modulated signal using at least one of the wireless broadcasting mechanism or the wired broadcasting mechanism.

20. The method of claim 1, wherein the intended recipient is unable to decode other portions of the encoded information in the information stream that are not intended for the intended recipient such that the intended recipient is able to decode the portion of the information intended for the intended recipient but is unable to decode the other portions of the encoded information in the information stream that are not intended for the intended recipient.

* * * * *